United States Patent [19]
Sato et al.

[11] Patent Number: 4,839,639
[45] Date of Patent: Jun. 13, 1989

[54] PAGING RECEIVER HAVING BATTERY SAVING CIRCUIT

[75] Inventors: Toshifumi Sato; Takashi Oyagi, both of Tokyo, Japan

[73] Assignee: NEC Corporation, Tokyo, Japan

[21] Appl. No.: 2,329

[22] Filed: Jan. 12, 1987

[30] Foreign Application Priority Data

Jan. 10, 1986 [JP] Japan ................... 61-1974

[51] Int. Cl.$^4$ ............................. H04Q 7/00
[52] U.S. Cl. ............................. 340/825.44; 455/343; 371/47
[58] Field of Search ............ 340/825.44, 825.47, 340/825.48, 311.1; 455/31, 38, 228, 343; 379/56, 57; 371/47

[56] References Cited

U.S. PATENT DOCUMENTS

| | | | |
|---|---|---|---|
| 3,769,593 | 10/1973 | Williams | 455/343 |
| 4,419,765 | 12/1983 | Wycoff et al. | 340/825.48 |
| 4,506,262 | 3/1985 | Vance et al. | 340/825.44 |
| 4,523,332 | 6/1985 | Mori | 455/228 |
| 4,652,875 | 3/1987 | Waki | 340/825.44 |
| 4,663,623 | 5/1987 | Lax et al. | 455/343 |

FOREIGN PATENT DOCUMENTS 2144565 3/1985 United Kingdom ........... 340/825.44

Primary Examiner—John W. Caldwell, Sr.
Assistant Examiner—Edwin C. Holloway, III
Attorney, Agent, or Firm—Sughrue, Mion, Zinn, Macpeak & Seas

[57] ABSTRACT

A paging receiver includes an improved battery saving circuit which reduces battery usage by powering the radio section and the waveform shaping circuitry only during intervals which include address codewords specific to the given receiver group. Power is not supplied during intervals containing synchronization code signals other than during the first such interval directly following the preamble code. Upon detecting a preamble code during said intervals, power is supplied continuously for a time period sufficient to encompass the synchronization code interval.

8 Claims, 8 Drawing Sheets

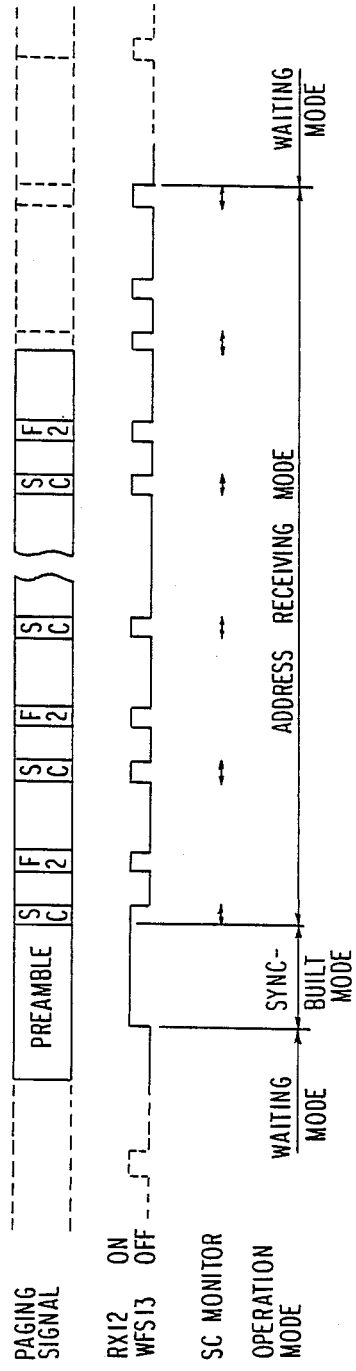

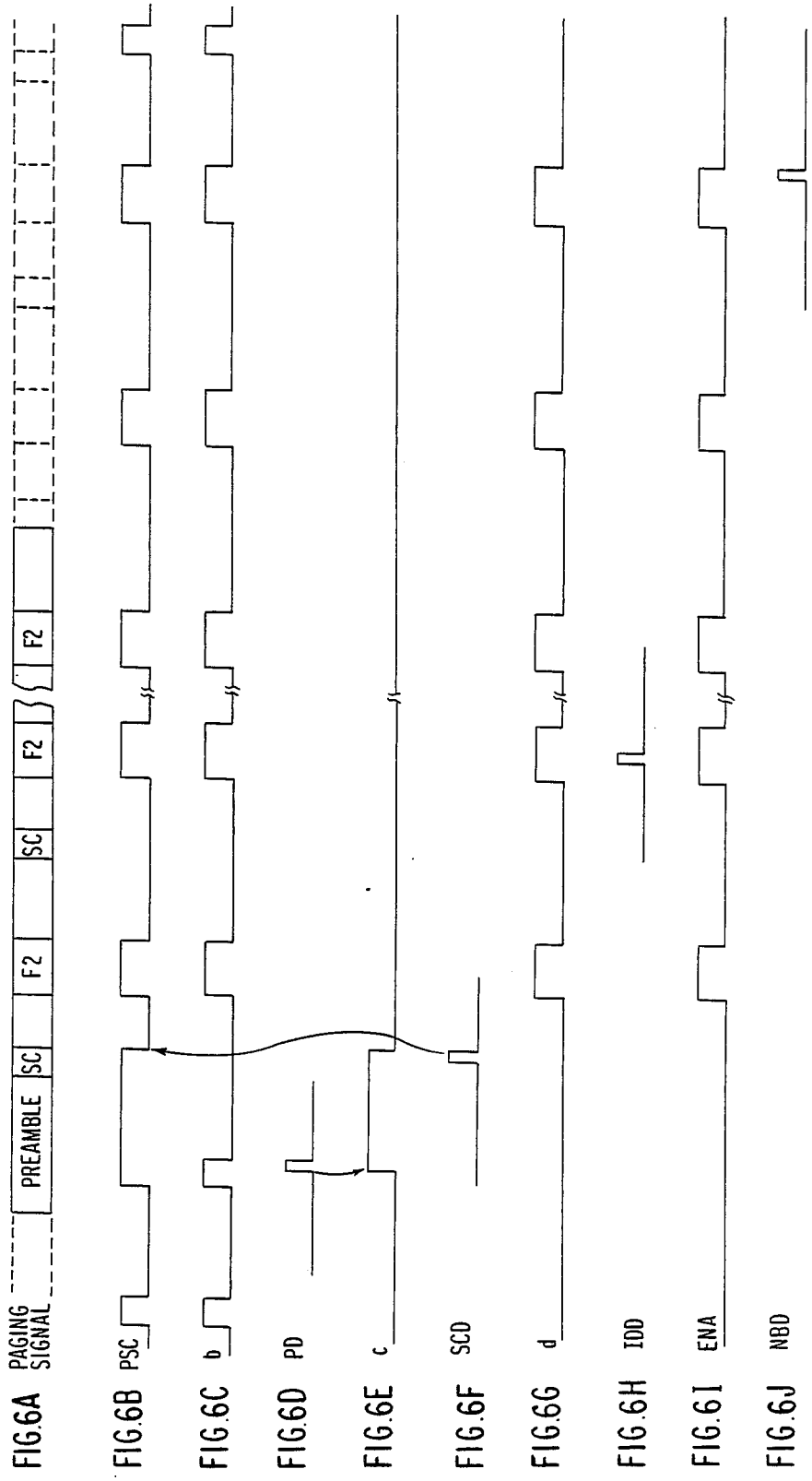

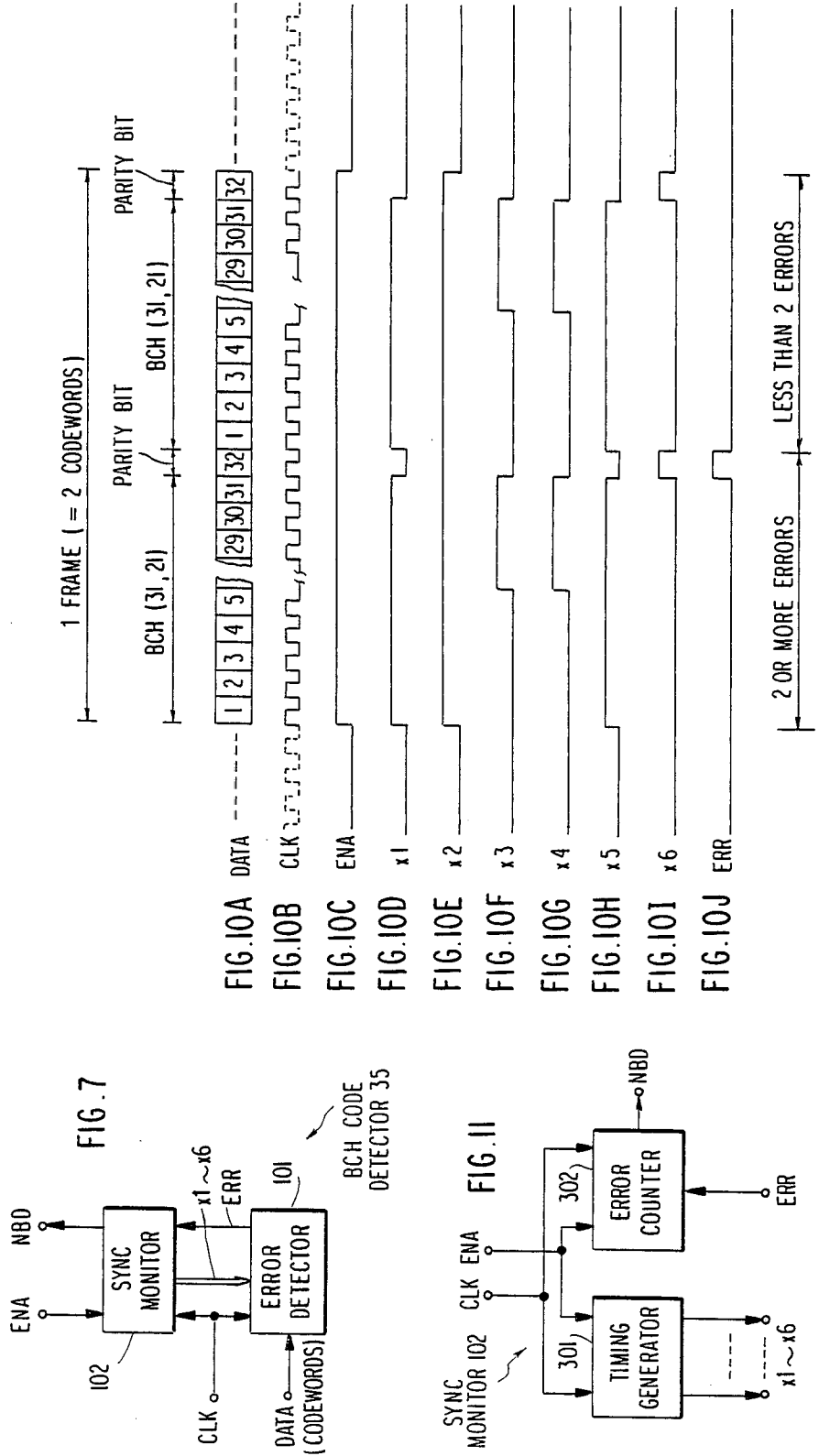

FIG. 9

| INPUT | | OUTPUT | | INPUT | | OUTPUT | |
|---|---|---|---|---|---|---|---|
| $A_0\,A_1\,A_2\,A_3\,A_4$ | $B_0\,B_1\,B_2\,B_3\,B_4$ | $e=0$ | $e=1$ | $A_0\,A_1\,A_2\,A_3\,A_4$ | $B_0\,B_1\,B_2\,B_3\,B_4$ | $e=0$ | $e=1$ |
| 0 0 0 0 0 | 0 0 0 0 0 | 1 | 0 | 1 1 1 0 0 | 1 1 1 0 0 | 0 | 1 |
| 1 0 0 0 0 | 1 0 0 0 0 | 0 | 1 | 0 1 1 1 0 | 0 1 1 1 0 | 0 | 1 |
| 0 1 0 0 0 | 0 1 0 0 0 | 0 | 1 | 0 0 1 1 1 | 0 0 1 1 1 | 0 | 1 |
| 0 0 1 0 0 | 0 0 1 0 0 | 0 | 1 | 1 0 1 1 0 | 1 0 1 1 0 | 0 | 1 |
| 0 0 0 1 0 | 0 0 0 1 0 | 0 | 1 | 0 1 0 1 1 | 0 1 0 1 1 | 0 | 1 |
| 0 0 0 0 1 | 0 0 0 0 1 | 0 | 1 | 1 1 0 1 0 | 1 1 0 1 0 | 0 | 1 |
| 1 1 0 0 0 | 1 1 0 0 0 | 0 | 1 | 0 1 1 0 1 | 0 1 1 0 1 | 0 | 1 |
| 0 1 1 0 0 | 0 1 1 0 0 | 0 | 1 | 1 0 1 0 1 | 1 0 1 0 1 | 0 | 1 |
| 0 0 1 1 0 | 0 0 1 1 0 | 0 | 1 | 1 1 0 0 1 | 1 1 0 0 1 | 0 | 1 |
| 0 0 0 1 1 | 0 0 0 1 1 | 0 | 1 | 1 0 0 1 1 | 1 0 0 1 1 | 0 | 1 |
| 1 0 1 0 0 | 1 0 1 0 0 | 0 | 1 | 1 1 1 1 0 | 1 1 1 1 0 | 0 | 1 |
| 0 1 0 1 0 | 0 1 0 1 0 | 0 | 1 | 0 1 1 1 1 | 0 1 1 1 1 | 0 | 1 |
| 0 0 1 0 1 | 0 0 1 0 1 | 0 | 1 | 1 1 0 1 1 | 1 1 0 1 1 | 0 | 1 |
| 1 0 0 1 0 | 1 0 0 1 0 | 0 | 1 | 1 0 1 1 1 | 1 0 1 1 1 | 0 | 1 |
| 0 1 0 0 1 | 0 1 0 0 1 | 0 | 1 | 1 1 1 0 1 | 1 1 1 0 1 | 0 | 1 |
| 1 0 0 0 1 | 1 0 0 0 1 | 0 | 1 | 1 1 1 1 1 | 1 1 1 1 1 | 0 | 1 |
| | | | | COMBINATIONS OTHER THAN THE ABOVE | | 0 | 0 |

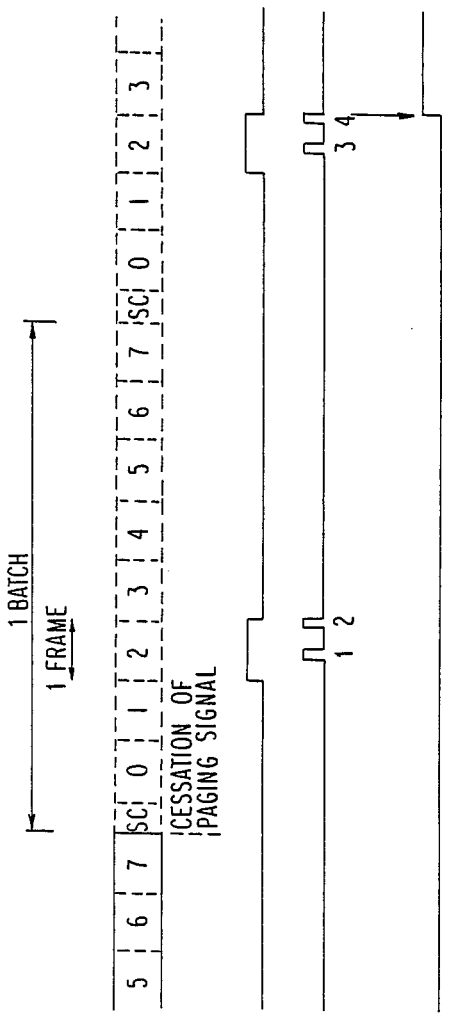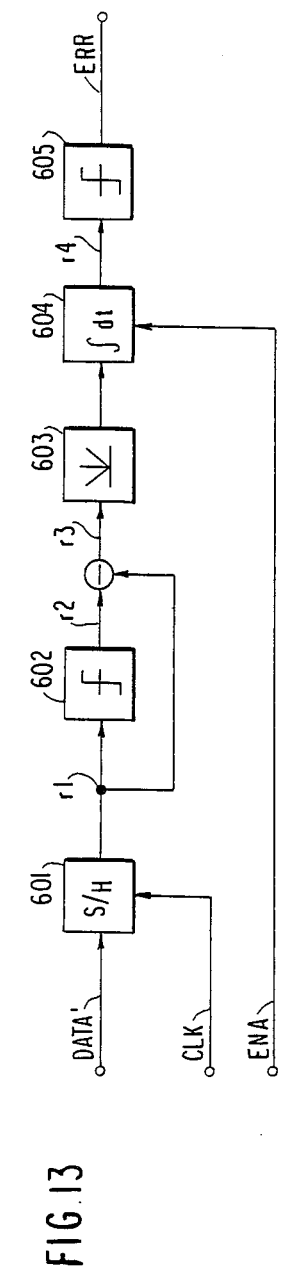

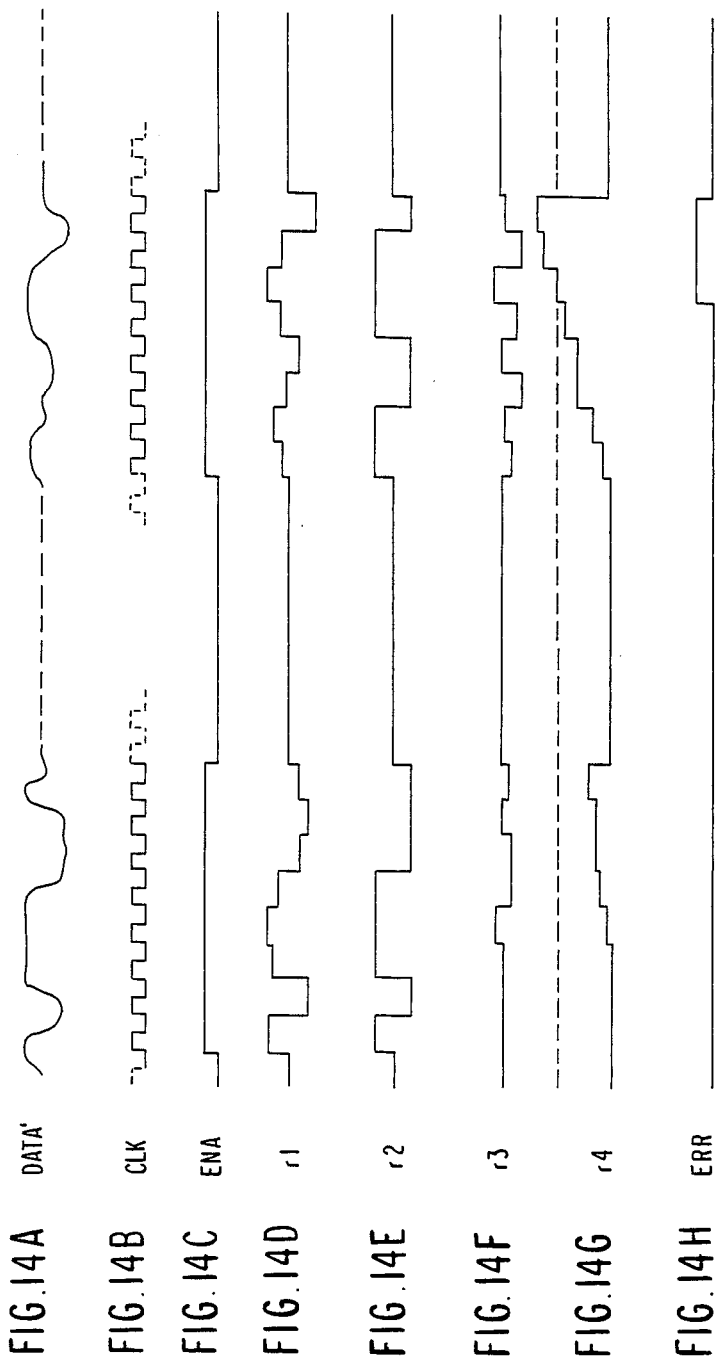

PAGING RECEIVER HAVING BATTERY SAVING CIRCUIT

BACKGROUND OF THE INVENTION

The present invention relates to a paging receiver having a battery saving circuit and, more particularly, to the sync monitoring of such a receiver and the control of the battery saving circuit.

Paging signals developed for use in calling paging receivers include the POCSAG (Post Office Code Standardisation Advisory Group) code as proposed by the British Post Office. The POCSAG code consists of a preamble signal and a number of batches which follow the preamble signal. One batch is made up of a single synchronization codeword (SC) and eight frames each consisting of two codewords and adapted for the transmission of an address codeword or a message codeword. Paging receivers are divided into eight groups such that a receiver belonging to a given one of the eight groups receives and processes only the address codeword of a given frame in each of the batches. For example, a paging receiver which belongs to the second group does not receive and process address codewords except for that one which is contained in the second frames.

Usually, a paging receiver includes a sync monitoring circuit and a battery saving circuit. The sync monitoring circuit in turn includes SC detecting means and means for controlling the battery saving circuit. The sync monitoring circuit monitors SCs in consecutive batches and, when it does not receive an SC in N (e.g. N=2) consecutive batches, detemines that the paging signal has ceased and restores the battery saving circuit to a battery saving mode. In battery saving mode, the receiver enables receiving circuit and related circuitry intermittently so that a preamble signal may be received.

A problem with the prior art sync monitoring circuit as described above is that it has to monitor not only the address codeword in each batch which is assigned to its own group but also an SC. Specifically, while a paging signal is being received, the operation time of the receiving circuit and related circuitry is prolonged by a fraction which is equal to the reception time, resulting in low battery saving efficiency. Another problem is that because the sync monitoring circuit decides that the paging signal has ceased when the SC is not detected within a given, SCs in a following one of a plurality of paging signals which may be transmitted continuously cannot be detected.

SUMMARY OF THE INVENTION

It is therefore an object of the present invention to provide a paging receiver which operates with improved battery saving efficiency during reception of a paging signal.

It is another object of the present invention to provide a paging receiver which, when paging signals are transmitted continuously, is capable of receiving a following address codeword accurately.

In accordance with the present invention there is provided a paging receiver comprising a receiving section for receiving a paging signal which includes preamble signal, a synchronization codeword and an address codeword, switch means for controlling the power supply to the receiving section in response to a control signal, means for detecting the preamble signal to produce a preamble detect signal, means for detecting the synchronization codeword to produce a synchronization codeword detect pulse, means for detecting the address codeword to produce an address codeword detect pulse, error detector means for detecting an error in the address codeword and producing an error detect pulse when the number of errors detected is greater than a predetermined value, and a controller for, in a waiting mode, intermittently generating the control signal at a predetermined interval, continuously generating the control signal for a predetermined duration upon receiving the preamble detect pulse during the intermittent generation of the control signal, generating the control signal at a predetermined timing, upon receiving the synchronization codeword detect pulse during the continuous generation of the control signal, generating the control signal at said predetermined interval upon receiving the error detect pulse during the generation of the control signal at said predetermined timing, and applying the generated control signal to the switch means.

BRIEF DESCRIPTION OF THE DRAWINGS

The above and other objects, features and advantages of the present invention will become more apparent from the following detailed description taken with the accompanying drawings in which:

FIGS. 3A to 3D and 4A to 4D are timing charts demonstrating prior art sync monitoring and battery saving operations;

FIGS. 6A to 6J are timing charts demonstrating the operation of the circuit of FIG. 5;

FIG. 7 is a block diagram showing a specific construction of a BCH code detector in accordance with the present invention;

FIG. 9 is a chart showing an input-output characteristic of a logic circuit which is included in the error detector of FIG. 8;

FIGS. 10A to 10J are timing charts representative of the operation of the FIG. 8 circuit;

FIG. 11 is a block diagram of a sync monitor as shown in FIG. 7;

FIGS. 12A to 12D are timing charts demonstrating the operation of the FIG. 11 circuit;

FIG. 13 is a block diagram showing another specific construction of the BCH code detector in accordance with the present invention; and FIGS. 14A to 14H are timing charts showing the operation of the FIG. 13 circuit.

DETAILED DESCRIPTION OF THE PREFERRED EMBODIMENTS

Figure 1:
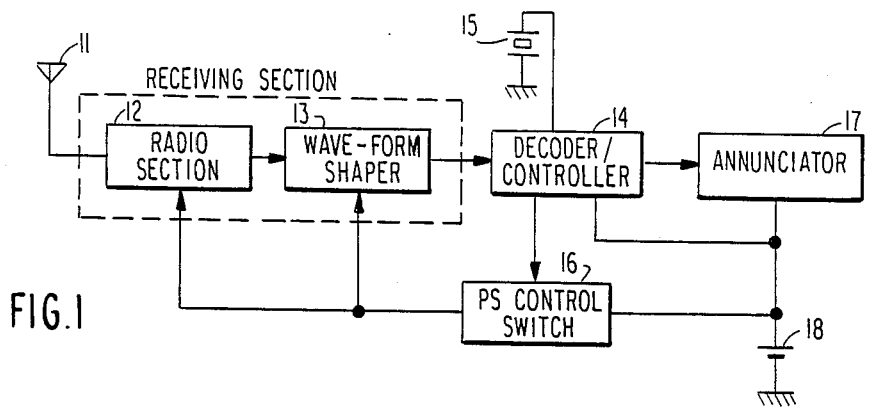
FIG. 1 is a block diagram showing a paging receiver in accordance with the present invention.

Referring to FIG. 1, a paging signal picked up by an antenna 11 is fed to a radio section 12 which forms a part of a receiving section. The radio section 12 amplifies the received signal, converts its frequency, and demodulates it to produce a baseband signal. The demodulated signal is converted by a wave-form shaper 13 into a rectangular wave which is then applied to a decoder and controller 14. The decoder and controller 14 is adapted to decide whether the received signal contains an address codeword which is directed to the receiver. If the received signal contains the desired address codeword, the decoder and controller 14 energizes a speaker or like annunciator 17 to alert the bearer of the receiver of the page. A crystal oscillator 15 functions to supply the decoder and controller 14 with a reference clock.

The decoder and controller 14 and the annunciator 17 are continuously powered by a battery 18 while the radio section 12 and wave-form shaper 13 are powered via a power supply (PS) control switch 16 which is controlled by the decoder and controller 14. In a waiting mode, the PS control switch 16 is intermittently closed as to power the radio section 12 and wave-form shaper 13. While the switch 16 is closed, the decoder and controller 14 searches for a preamble signal.

When the detector and controller 14 has detected a preamble signal, the PS control switch 16 remains closed continuously so as to maintain the radio section 12 and wave-form shaper 13 in an operative condition. Then, upon detection of a synchronization codeword (SC), the switch 16 is closed only for the duration of the particular frame of one batch to which the receiver belongs. During this period of time, the decoder and controller 14 detects a BCH (Bose-Chaudhuri-Hocquenghem) code, which constitutes a codeword, and a preamble signal as well as an address codeword. In this manner, the receiver in accordance with the present invention allows the radio section 12 and wave-form shaper 13 to be turned on only for the duration of two codewords of its own frame while an address codeword is searched for. The receiver, therefore, achieves a higher battery saving efficiency than the prior art receiver which should be turned on not only for the duration of two codewords of its own frame but also for the duration of an SC. In addition, the receiver of the present invention is constructed so as to detect a preamble signal in parallel with an address codeword, so that it does not fail to receive paging signals which may be transmitted continuously.

Figure 2:
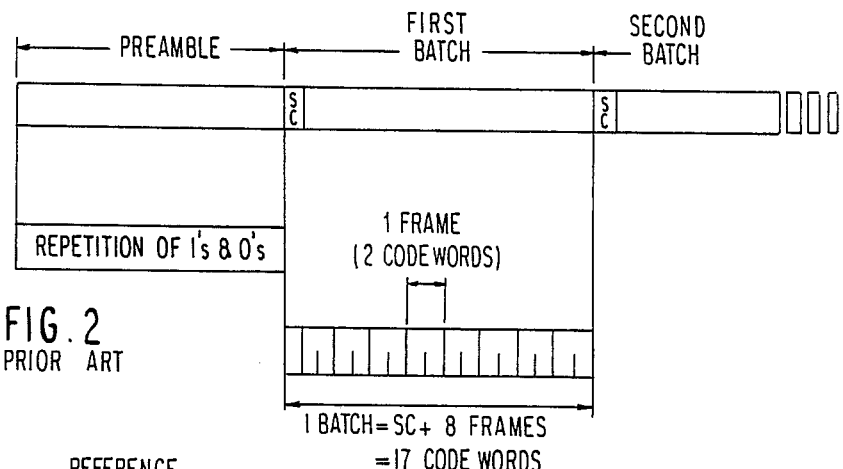
FIG. 2 is a format representative of the POCSAG code.

To better understand the present invention, the POCSAG code and the prior art sync monitoring and battery saving functions will now be described. As shown in FIG. 2, POCSAG code begins with a preamble signal and includes a number of batches which follow the preamble signal. Usually, the preamble signal is comprised of a repetitive pattern of "1" and "0". One batch consists of an SC which comprises a single codeword, and eight frames each comprising two codewords.

Referring to FIGS. 3A to 3D, a prior art paging receiver which is waiting for a paging signal, or in a waiting mode, searches for a preamble signal by turning on the radio section 12 and wave-form shaper 13 intermittently. Upon detection of a preamble signal, the receiver turns on the radio section 12 and wave-form shaper 13 continuously in order to search for an SC. This is the sync build mode as shown in FIG. 3D. When an SC is detected, the radio section 12 and waveform shaper 13 are enabled for the duration of the SC of each batch of the paging signal and for the duration of each frame to which the receiver belongs (second frames F2 in this example), whereby an SC monitoring operation (FIG. 3C) and an address codeword detecting operation are performed. The address codeword detecting operation is represented by the address receiving mode in FIG. 3. If an SC is not received two consecutive times periods, the receiver returns to the waiting mode.

The on-off control of the radio section 12 ad waveform shaper 13 as shown in FIG. 3B is representative of the prior art battery saving control. While the prior art receiver is turned on for the duration of three codewords in total, i.e., one codeword which constitutes an SC and two codewords which constitute one frame, the receiver of the present invention is turned only for the duration of two codewords, or one frame, enhancing the battery saving efficiency.

Referring to FIGS. 4A to 4D, when paging signals I and II are transmitted one after another, the prior art receiver fails to receive the following paging signal II since it does not return to the waiting mode except when an SC fails to be detected on two consecutive occasions. In contrast, the receiver of the present invention safely receives the paging signal II since a preamble signal is detected in parallel even in the address receiving mode.

Figure 5:
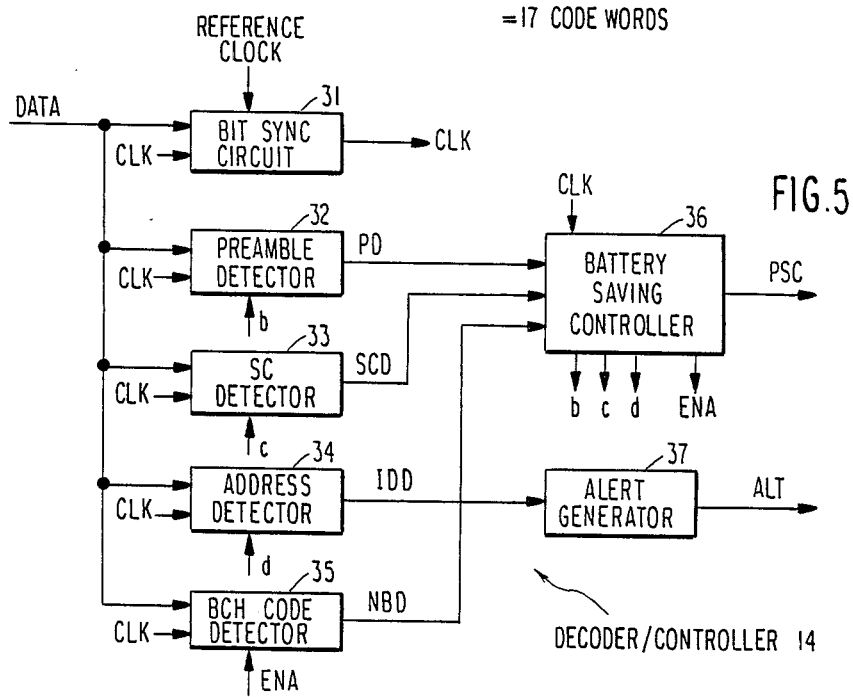
FIG. 5 is a block diagram showing an essential part of the receiver as shown in FIG. 1.

Referring to FIG. 5, the specific construction of an essential part of the decoder and controller 14 in accordance with the present invention is shown. The operation of the circuit shown in FIG. 5 will be described with reference to the timing charts of FIGS. 6A to 6J. In FIG. 5, the decoder and controller 14 includes a bit sync circuit 31 to which the reference clock (e.g. 32 kHz) from the crystal oscillator 13 (FIG. 1) is coupled. The bit sync circuit 31 feeds a recovered clock CLK to various sections of the receiver by timing the reference clock to the output signal DATA of the wave-form shaper 13 (FIG. 1). A battery saving (BS) controller 36, in a waiting mode, delivers a power supply control signal PSC and a control signal b to the receiving section (the radio section 12 and wave-form shaper 13) and a preamble detector 32, respectively, to enable them to intermittently search for a preamble, as shown in FIGS. 6B and 6C.

In response to the detection of a preamble signal during the waiting mode, the preamble detector 32 delivers a preamble detect signal PD to the BS controller 36. As shown in FIGS. 6D, 6A and 6E, the BS controller 36 applies to the receiving section and an SC detector 33, respectively, the PSC signal and a control signal c, for a predetermined period of time (e.g. a length of seventeen words at maximum) for detecting an SC. In this SC search mode, when the SC detector 33 has detected an SC, it sends an SC detect pulse SCD to the BS controller 36. In response, the BS controller 36 delivers to the receiving section, the preamble detector 32, an address detector 34 and a BCH code detector 35, respectively, the PSC signal, the control signal b, a control signal d and a monitor enable signal ENA, as shown in FIGS. 6B, 6C, 6G and 6I. The BS controller 36 then enters into an address receiving mode. As shown in FIGS. 6B, 6C, 6G and 6I, during this mode, the PCS signal and control signals b, d and ENA are each being fed only for the duration of the second frame F2 to which the receiver belongs.

As shown in FIG. 6H, when the address detector 34 has detected an address signal directed to the receiver during the address receiving mode, it generates a detect pulse IDD. An alert generator 37 responds to the pulse IDD by applying an alert signal ALT to the annunciator 17 (FIG. 1), whereby the annunciator 17 produces an alert tone.

In the address receiving mode, when the BCH code detector 35 has not detected a BCH code in two consecutive batches, it produces a mode cancel pulse NBD, as shown in FIG. 6J. In response to the pulse NBD, the BS controller 36 generates a PSC signal and a control signal b in order to restore the receiver to the waiting mode.

Meanwhile, assume that the BCH code detector 35 has not detected a BCH code in, for example, two consecutive batches. Even in this situation, when the preamble detector 32 has detected a preamble signal, the BS controller 36 delivers a PSC signal and a control signal c so as to restore the receiver to the SC search mode. This allows the receiver to receive the signal II which follows the signal I as shown in FIG. 4A, without fail.

Referring to FIG. 7, a specific construction of the BCH code detector 35 is shown in a block diagram. As shown, the detector 35 is made up of an error detector 101 and a sync monitor 102. The error detector 101 receives a codeword of a predetermined frame and a recovered clock signal CLK while receiving switch control signals xl to x6 from the sync monitor 102. When the error detector 101 has detected any error in the received codeword, it produces an error detect signal ERR. The sync monitor 102, on the other hand, receives the error detect signal ERR, sync monitor enable signal ENA and clock signal CLK. When the number of signals ERR applied to the sync monitor 102 has exceeded a predetermined valve, e.g., when a predetermined number of errors have been detected in two consecutive batches, the sync monitor 102 delivers a control signal NBD indicating that synchronization has failed or that the paging signal has ceased. As previously stated, the control signal NBD causes the BS controller 36 (FIG. 5) to enter the a waiting mode.

Figure 8:
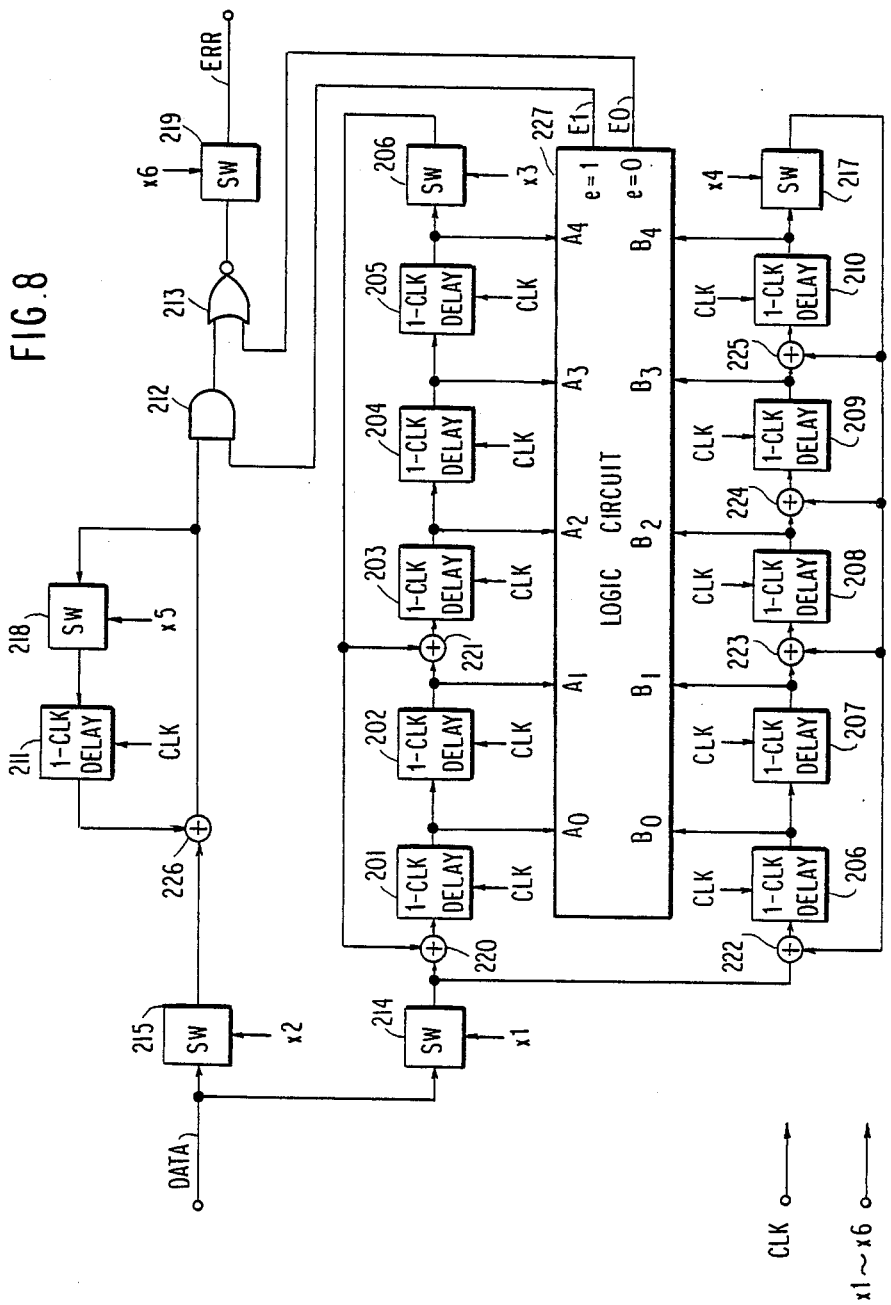
FIG. 8 is a block diagram of an error detector as shown in FIG. 7.

Referring to FIG. 8, a specific construction of the error detector 101 of FIG. 7 is shown in a block diagram. As shown, the detector 101 is made up of 1-clock delay circuits 201 to 211, an AND gate 212, a NOR gate 213, switches 214 to 219, Exclusive-OR (EXOR) gates 220 to 226, and a logic circuit 227. The logic circuit 227 is constructed so as to have an input-output characteristic as shown in FIG. 9. An output signal $E_0$ of the logic circuit 227 is representative of the number of errors.

The operation of the error detector 101 will be described with reference to FIGS. 7 and 8 and the timing chart of FIG. 10. In FIG. 10, an address codeword included in a paging signal DATA has been converted into an error correcting and detecting code by extended BCH code (n, k; d)=(32, 21; 6) where n denotes the code length, k the number of data bits, and d the minimum Hamming distance.

Extended BCH (32, 21; 6) code consists of BCH (31, 21; 5) and a parity bit. Because the minimum Hamming distance d is 6, the extended BCH code has the capability of correcting one error and detecting four errors, and this capability is utilized by the error detector 101 (FIG. 8) of this particular embodiment. The 1-clock delays 201 to 205 and EXOR gates 220 and 221 shown in FIG. 8 constitute a circuit for computing a syndrome of BCH (31, 21; 5), as do the 1-clock delays 206 to 210 and EXOR gates 222 to 225. The output signals $E_0$ and $E_1$ of the logic circuit 227 are respectively representative of the error bit number (e=0, 1) of BCH (31, 21; 5) and that the error has been detected.

As shown in FIG. 10J, when two or more bits of error have been detected, a detect code ERR is produced at the end of one address codeword.

Referring to FIG. 11, a specific construction of the sync monitor 102 of FIG. 7 is shown. The monitor 102 is comprised of a timing generator 301 and an error counter 302. In response to the clock CLK and enable signal ENA, the timing generator 301 produces signals x1 to x6 which are adapted to control switches 214 to 217 (see FIG. 8) installed in the error detector 101 at the timings shown in FIGS. 10D to 10I. In this construction, the error detector 101 (FIG. 7) is caused to perform an error detection only on predetermined frames of the paging signal DATA. As shown in FIG. 12, when the error signal ERR has been detected four times in two consecutive batches, i.e., when it has been detected twice in one batch and continued over two batches on the same frame, the error counter 302 determines that the paging signal has ceased and applies a contreol signal NBD to the BS controller 36 to thereby bring it into the waiting mode.

In the construction and operation as described above, if the SC of the leading batch is detected, sync monitoring can be accomplished without receiving the SCs of the subsequent batches.

Referring to FIG. 13, another specific construction of the error detector 101 is shown. The detector 101 is made up of a sample and hold circuit 601, threshold circuits 602 and 605, a full-wave rectifier 603, and an integrating circuit 604. It is to be noted that the paging signal DATA' as shown in FIG. 13 comprises an analog signal which contains receiver noise, i.e., a signal which has not been propagated through the wave-form shaper 13 as shown in FIG. 1.

The operation of the error detector of FIG. 13 will be described with reference to the timing chart of FIG. 14. The paging signal DATA' is sampled by the sample and hold circuit 601 timed to every clock pulse, an output of the circuit 601 being represented by r1 in FIG. 14D. The signal r1 is subjected to data decision threshold detection at the threshold circuit 602, resulting in a signal r2, as shown in FIG. 14E. Here, the threshold circuit 602 is set such that if the signal DATA' is free from noise, the signal r1 and r2 are of the same level. Hence, a signal r3 (FIG. 14F) representative of the difference between the signals r1 and r2 is an error signal which indicates the magnitude of receiver noise so long as no detection error occurs. The error signal r3 is rectified and integrated by the full-wave rectifier 603 and the integrating circuit 604 to result in a signal r4, as shown in FIG. 14G.

Because the integrating circuit 604 is discharged frame by frame, the signal r4 indicates an integrated value of the magnitude of the error signal r3 which occurred in one frame. As the integrated value increases beyond a predetermined valve, the threshold circuit 605 produces an error detect signal ERR (FIG. 14H).

In summary, it will be seen that the present invention provides a paging receiver which detects errors in a paging signal to accomplish sync monitoring without resorting to receiving every SC in the consecutive batches.

Further, in the receiver of the present invention, errors in the paging signal and the preamble are detected in a manner such that sync monitoring can be accomplished while also permitting a subsequent paging signal to be monitored. It follows that, in the exemplary paging signal format of FIG. 2, the operation time of the receiving circuit is reduced, except for the leading batch, to ⅔ of the operation time heretofore available, increasing the battery saving efficiency.

In addition, in some applications wherein a signal can be always received with a preamble first, it is possible to enhance the data transmission efficiency by causing an SC to be transmitted in the leading batch only.

What is claimed is:

1. A paging receiver comprising:
 a receiving section for receiving a paging signal which includes a preamble signal, a synchronization codeward and an address codeword;
 switch means for controlling the supply of power to said receiving section in response to a control signal;
 means for detecting the preamble signal to produce a preamble detect pulse;
 means for detecting said synchronization codeword to produce a synchronization codeword detect pulse;
 means for detecting said address codeword to produce an address codeword detect pulse;
 error detector means for detecting an error in said address codeword and producing an error detect pulse only when the number of bit errors detected in said codeword is equal to or greater than two, said error detector means being capable of correcting only a one-bit error in said codeword;
 sync monitor means for counting said error detect pulses for a predetermined period of time and producing a sync monitor pulse when the number of error detect pulses counted is greater than a predetermined value; and
 a controller arranged to receive said preamble detect pulse, said synchronization codeword detect pulse and said sync monitor pulse, said controller comprising means for generating said control signal intermittently at a predetermined interval while in a waiting mode, means for continuously generating said control signal for a predetermined duration in response to the reception of said preamble detect pulse during the intermittent generation of said control signal, means for generating said control signal at a predetermined timing in response to the reception of said synchronization codeword detect pulse during the continuous generation of said control signal, means for generating said control signal at said predetermined interval upon the reception of said sync monitor pulse during the generation of said control signal at said predetermined timing, and means for applying said generated control signal to said switch means.

2. A paging receiver as claimed in claim 1, wherein said controller comprises means for generating said control signal continuously for said predetermined duration upon the reception of said preamble detect signal during the generation of said control signal at said predetermined timing, and means for applying said generated control signal to said switch means.

3. A paging receiver as claimed in claim 2, wherein said address codeword is transmitted in one of a predetermined number of frames, and wherein said predetermined timing includes the timing of said one frame in which said address codeword is transmitted.

4. A paging receiver as claimed in claim 1, further comprising means for generating an alert signal in response to said address codeword detect pulse.

5. A method of decreasing the battery usage of a receiver, comprising the steps of:
 supplying power to a predetermined section of said receiver in response to a control signal;
 generating said control signal intermittently while said receiver is waiting for a paging signal;
 generating said control signal at a predetermined timing in response to the detection of a synchronization codeword in said paging signal;
 detecting bit errors in an address codeword which is contained in said paging signal while said control signal is being operated at said predetermined timing, and, only when the number of bit errors is equal to or greater than two, providing an error detect pulse, and only when the number of bit errors is less than two, correcting said bit error; and
 counting said error detect pulses for a predetermined period of time, and, when the number of error detect pulses counted is greater than a predetermined value, replacing the generation of said control signal at said predetermined timing with said intermittent generation.

6. A method as claimed in claim 5, further comprising the steps of:
 generating said control signal continuously for a predetermined duration when a preamble signal in said paging signal is detected;
 detecting said synchronization codeword while said control signal is being continuously for said predetermined duration; and
 generating said control signal continuously for a predetermined duration when said preamble signal is detected while said control signal is being generated at said predetermined timing.

7. A paging receiver having a battery saving circuit and constructed to receive and process a paging signal, said paging receiver comprising; controller means including error detection means for detecting bit errors in an address codeword contained in said paging signal to produce an error detect signal only when the number of errors is equal to or greater than two, and to correct said bit errors only when the number of errors is less than two; sync monitor means for counting said error detect signals for a predetermined period of time and providing a sync monitor signal when the number of error detect signals detected is greater than a predetermined value, and control means for controlling said battery saving circuit in response of said sync monitor signal output by said error detection means.

8. A paging receiver having a battery saving circuit and constructed to receive and process a paging signal, said paging receiver comprising; controller means, including:
 means for detecting a preamble signal contained in said paging signal;
 error detection means for detecting bit errors in an address code contained in said paging signal, to produce an error detect signal only when the number of errors is equal to or greater than two, and to correct said bit errors only when the number of errors is less than two; sync monitor means for counting said error detect signals for a predetermined period of time, and for providing a sync monitor signal when the number of error detect signals counted is greater than a predetermined value; and
 control means for outputting a signal for controlling said battery saving circuit in response to said sync monitor signal, and for outputting a signal for enabling a synchronization codeword detecting section in response to said sync monitor signal and a preamble detect signal output by said preamble detect means.

* * * * *

UNITED STATES PATENT AND TRADEMARK OFFICE
CERTIFICATE OF CORRECTION

PATENT NO. : 4,839,639

DATED : June 13, 1989

INVENTOR(S) : Sato et al.

It is certified that error appears in the above-identified patent and that said Letters Patent is hereby corrected as shown below:

Col. 1, line 33, delete "detemines" and insert --determines--.
Col. 1, line 45, before "reception" insert --SC--.
Col. 3, line 50, delete ""1" and "0"" and insert --binary ones and zeros--.
Col. 4, line 3, delete "ad" and insert --and--.
Col. 5, line 29, delete "valve" and insert --value--.
Col. 6, line 17, delete "contreol" and insert --control--.
Col. 8, line 8, delete "operated" and insert --generated--.
Col. 8, line 24, after "being" insert --generated--.

Signed and Sealed this

Twenty-eighth Day of August, 1990

Attest:

HARRY F. MANBECK, JR.

*Attesting Officer*　　　*Commissioner of Patents and Trademarks*